United States Patent [19]

Vehige

[11] Patent Number: 5,451,237
[45] Date of Patent: Sep. 19, 1995

[54] COMPOSITIONS AND METHODS FOR INHIBITING AND REDUCING LYSOZYME DEPOSITION ON HYDROPHILIC CONTACT LENSES USING BIOCOMPATIBLE COLORED COMPOUNDS

[76] Inventor: Joseph G. Vehige, 28386 La Pradera, Laguna Niguel, Calif. 92677

[21] Appl. No.: 149,860

[22] Filed: Nov. 10, 1993

[51] Int. Cl.$^6$ .................................................. D06P 3/00
[52] U.S. Cl. ........................................... 8/507; 134/901
[58] Field of Search ............... 8/507; 351/160 H, 162; 422/37; 134/901

[56] References Cited

U.S. PATENT DOCUMENTS

| | | | |
|---|---|---|---|
| 3,954,965 | 5/1976 | Boghosian et al. | 424/81 |
| 4,168,112 | 9/1979 | Ellis | 351/160 H |
| 4,250,269 | 2/1981 | Buckman | 8/496 |
| 4,252,421 | 2/1981 | Foley, Jr. | 351/162 |
| 4,259,202 | 3/1981 | Tanaka | 252/107 |
| 4,414,127 | 11/1983 | Fu | 252/95 |
| 4,444,785 | 4/1984 | Mandt et al. | 424/291 |
| 4,543,200 | 9/1985 | Sherman | 252/106 |
| 4,693,939 | 9/1987 | Ofstead | 428/421 |
| 4,734,222 | 3/1988 | Winterton et al. | 252/546 |
| 4,783,488 | 11/1988 | Ogunbiyi et al. | 514/635 |
| 4,818,801 | 4/1989 | Rice et al. | 526/247 |
| 4,863,627 | 9/1989 | Davies et al. | 422/28 |
| 4,895,676 | 1/1990 | De Gregorio | 8/507 |
| 4,979,959 | 12/1990 | Guire | 623/66 |
| 4,997,626 | 3/1991 | Dziabo et al. | 422/37 |
| 5,013,484 | 5/1991 | De Gregorio | 8/507 |
| 5,141,665 | 8/1992 | Sherman | 252/106 |
| 5,263,922 | 11/1993 | Guire | 623/66 |

FOREIGN PATENT DOCUMENTS 1221334  2/1971  United Kingdom .

OTHER PUBLICATIONS

Missiroli, A., Riicci, F., Pocobelli, A., Cedrone, C., Cerulli, L., *CLAO Journal (Contact Lens Association of Ophthamologists)*, Apr. 1991, 17(2)pp. 126–128.
Missiroli, et al., *Use of Bendazac Lysine To Limit Protein Deposition On Soft Contact Lenses In Vitro*, CLAO Journal, vol. 17, No. 2, pp. 126–128 (Apr. 1991).
Catanese, et al, *In Vivo Influence of Bendazac, (AF-983), A Non-Steroideal Anti-Inflammatory Drug, On the Krebs Cycle In Rabbit Liver*, Bull. Chim. Farm., Aug. 1986, 125(8) pp. 298–302.

*Primary Examiner*—Paul Lieberman
*Assistant Examiner*—Caroline L. Dusheck
*Attorney, Agent, or Firm*—Jeffer, Mangels, Butler & Marmaro

[57] ABSTRACT

Disclosed are compositions and methods for inhibiting the uptake of proteins and reducing the formation of lysozyme deposits on the outer surface and inner bulk matrix of hydrophilic contact lenses. The method comprises contacting a contact lens with a positively charged chemical which imparts a tint to the lens.

10 Claims, No Drawings

COMPOSITIONS AND METHODS FOR INHIBITING AND REDUCING LYSOZYME DEPOSITION ON HYDROPHILIC CONTACT LENSES USING BIOCOMPATIBLE COLORED COMPOUNDS

FIELD OF THE INVENTION

This invention relates generally to cleaning contact lenses. More particularly, the present invention relates to compositions and methods useful for inhibiting the uptake of proteins and reducing the formation of protein deposits on the outer surface and/or in the inner bulk matrix of hydrophilic contact lenses using biocompatible colored compounds.

BACKGROUND OF THE INVENTION

During handling and wear, contact lenses are susceptible to the accumulation of a variety of materials which may adhere to the surface of the lens and/or lodge within and adhere chemically and/or spatially to the inner bulk matrix of the lens. For example, during wear, lenses contact proteinaceous materials such as lysozyme and mucoproteins, both of which are constituents of lachrymal tears, and lipids such as sterols, waxes, glycerides, phospholipids, fatty alcohols and acids.

If contact lenses are not properly cleaned, lysozyme, mucoproteins and other soils can accumulate on and/or in the lens to a point where the lens wearer begins to feel discomfort, for example due to altered lens fit, the lens spectral characteristics are adversely affected, for example through discoloration due to the deposits, disinfection may be impeded, and the gas permeability may be decreased. Such soiling decreases the overall estimated useful lifetime of the lens.

Certain types of cleaning or disinfecting techniques and compositions have been found inadequate for inhibiting and reducing the formation of these deposits on hydrophilic contact lenses. For example, it has been shown that sterilization techniques such as heat in the form of boiling water or steam can have adverse effects on soft lenses. High temperatures may cause tear proteins to be baked onto the contact lens polymer, resulting in difficulties in cleaning. Heat sterilization techniques also tend to accelerate lens buildup by precipitating absorbed proteinaceous materials. Sterile saline solutions have limited effect on the removal of soils, thus, requiring some additional cleaning procedure. Peroxides, which are effective disinfectants against ocular pathogens, have also been found to be inadequate for removing lens soils.

Attempts have been made to reduce and inhibit the tendency for proteins to adhere to a lens surface. For example, U.S. Pat. No. 4,168,112 to Ellis discloses forming a thin ionic polymeric coating on a contact lens having an ionically charged surface. The coating is electrostatically bound to the lens surface and reduces the tendency for mucoproteins to adhere to the lens surface. Ellis shows contact lens solutions containing cationic polymers for forming a hydrophilic polyelectrolytic complex on the lens surface wherein the complex acts as a hydrogel "cushion." Other additives to the lens solutions shown by Ellis include preservatives such as ethylenediaminetetraacetic acid (EDTA).

U.S. Pat. No. 4,414,127 to Fu discloses compositions which degrade and remove proteinaceous deposits from all types of contact lens plastics by chemically degrading these deposits into water-soluble proteins. Fu shows using metal chloride salts as catalysts for peroxide decomposition where the peroxide is used in a contact lens cleaning solution.

U.S. Pat. No. 4,259,202 to Tanaka discloses a solution used for cleaning and preserving contact lenses. The solution of Tanaka contains as an effective ingredient a particular monoester of saccharose with a fatty acid. The solution also contains an alkali metal salt of a saturated fatty acid and a compound selected from the group consisting of a polysaccharide and a polysaccharide derivative. Examples of the polysaccharide and its derivative include alkali metal salt of alginic acid, xanthan gum, alkali metal salt of carboxymethyl cellulose, hydroxypropyl methylcellulose and alkali metal salt of chondroitin sulfuric acid.

Bendazac lysine, an anti-cataract drug, has been found to limit protein deposition on soft contact lenses. See Missiroli, A., Ricci, F., Pocobelli, A., Cedrone, C., Cerulli, L., *CLAO Journal* (*Contact Lens Association of Ophthalmologists*), April 1991, 17(2) pp. 126-8. Bendazac lysine is an oxyacetic acid with known anti-inflammatory, antinecrotic, choleretic and antilipidaemic properties, but it is said that its principal effect is to inhibit the denaturation of proteins.

It would be desirable to provide an improved system for inhibiting and/or reducing the deposition of lysozyme and other protein on contact lenses, such as hydrophilic contact lenses. Desirably, the improved method would provide the contact lens wearer with an indication that the lens has been so treated and would facilitate handling of the treated lens by increasing lens visibility. It would also be desirable to provide a system which would provide the contact lens wearer with a periodic reminder to repeat the contact lens treatment. It would also be desirable to provide a system which would allow the user to detect visually the presence of protein deposits on contact lenses, thus prompting more vigorous cleaning of the lenses.

SUMMARY OF THE PREFERRED EMBODIMENTS

The present invention is directed to ophthalmically safe compositions and methods for cleaning contact lenses, and more specifically to compositions and methods used as out-of-eye inhibitors and reversers of surface and/or inner bulk matrix deposition of lysozyme on hydrophilic contact lenses.

In one aspect of the present invention, the formation of protein deposits on the surface and/or in the inner bulk matrix is reduced and/or inhibited by contacting a contact lens with a positively charged chemical agent which imparts a tint to the lens. Preferred agents are ocular and bio-compatible stains and vital dyes, more preferably green or blue in color, which are able to penetrate the lens polymer matrix to interact with negatively charged ionic sites on and/or within the lens. Specific preferred agents are selected from the group consisting of methylene blue and FD&C Green #3. The tinted agent can be employed alone or in combination with one or more additional chemical agents selected from the group consisting of basic polymeric carbohydrates, such as chitosan, chitosan salts such as chitosan hydrochloride, chitosan derivatives such as chitosan biguanide and mixtures thereof. These agents are described in U.S. patent application Ser. No. 07/986,959, to Powell et al., which is incorporated herein by reference.

In another aspect, the present invention is directed to a method of inhibiting the uptake of proteins and reversing the formation of protein deposits on hydrophilic contact lenses. The method includes the step of placing a contact lens in a hypotonic solution for a period of time sufficient to cause the lens to swell and the pores of the matrix to expand. Subsequently, a positively charged tinted chemical agent as described above is added to the solution in an amount sufficient to change the tonicity of the solution in order to cause the lens and the pores to constrict, while also facilitating desorption of protein deposits from the surface and matrix of the lens. The lens is soaked in the solution having the chemical agent for a period of time sufficient to substantially reduce and/or inhibit the formation of protein deposits on and/or in the lens.

In still another aspect, the present invention is directed to a method for detecting the presence of protein deposits on a contact lens. The method includes the steps of contacting a contact lens with a positively charged chemical agent which imparts a tint to the lens and which also stains protein deposits on the lens, and observing whether the contacting step has produced visibly stained protein deposits on the lens.

The foregoing and other objects, features and advantages of the present invention will become more readily apparent from the following detailed description.

DETAILED DESCRIPTION OF THE PREFERRED EMBODIMENTS

One system capable of effectively reducing, inhibiting and reversing the deposition of proteins, not only from the surface of a contact lens, but also from the inner bulk matrix of the lens, is disclosed in co-pending U.S. patent application Ser. No. 07/986,959, to Powell et al., filed Dec. 9, 1992. Powell et al. reduce, inhibit and/or reverse the formation of protein deposits on the surface and/or in the inner bulk matrix of a contact lens by contacting the contact lens with certain specific chemical agents. In one preferred embodiment of the Powell et al. method, the contact lens is contacted with a positively charged chemical agent selected from the group consisting of basic polymeric carbohydrates, such as chitosan, and mixtures thereof. This treatment step can be preceded by a step involving contacting the lens with a hypotonic solution for a time sufficient to cause the lens to swell and the pores of the lens to expand. Powell et al. thus provide highly effective methods for reducing, inhibiting and/or reversing protein deposition on and in contact lenses.

The present invention is directed to the use of various chemical agents as out-of-eye inhibitors and reversers of surface and inner bulk matrix deposition of lysozyme on hydrophilic contact lenses. The present invention is also directed to methods for inhibiting and/or reducing the formation of protein deposits on the surface and/or in the matrix of hydrophilic contact lenses. By virtue of the present invention, an improved system is provided for inhibiting and/or reducing the deposition of lysozyme and other protein on contact lenses which provides the contact lens wearer with an indication that the lens has been so treated. The improved method of the present invention furthermore facilitates handling of the treated lens by increasing lens visibility. The present invention also indicates to the contact lens wearer when it is time to repeat the contact lens treatment.

While the present invention can be used in connection with a variety of contact lenses, it is preferred that the contact lenses used with the present invention are hydrophilic lenses, such as those comprising methacrylic acid as a copolymer. Group III and Group IV lenses are examples of such lenses.

In one embodiment, the present invention involves a method of inhibiting the uptake of proteins and/or appreciably reducing the formation of tear protein deposits on the outer surface and/or in the inner bulk matrix of a hydrophilic contact lens. This method comprises contacting a contact lens with a chemical agent that is positively charged (at physiological pH's 7 to 8), water soluble, and imparts a tint to the lens. Through provision of the tint, this embodiment also assists the lens wearer in handling the lens. Furthermore, as the agent dissipates during normal use and care of the lens, the color fades, thus providing a reminder to the wearer to repeat the treatment of the lens at appropriate intervals (typically around one week to one month).

Preferred agents are ocular and bio-compatible stains and vital dyes, more preferably dyes which are cosmetically acceptable to the wearer, such as green or blue in color, and which provide a desirable handling tint. The tinted agents are able to penetrate the lens polymer matrix to interact with negatively charged ionic sites on and/or within the lens. Specific preferred agents for use in this embodiment of the invention include methylene blue and FD&C Green #3.

For purposes of this invention the term "appreciably" generally means that the lens is more comfortable to the lens wearer and the amount of proteins adhering to the lens is noticeably decreased under visible or UV spectroscopy, light microscopy, or any other suitable technique for measuring total lens protein. Beneficially, the term "appreciably" means the amount of proteins deposited on the lens is reduced by at least about 30% by weight or surface coverage/density, more preferably at least about 40%, and even more preferably about 75% to about 95%.

The positively charged chemical agent of this embodiment is preferably of a size small enough and of optimum steric structure when dissolved in the medium to enter and accumulate in the polymeric pores of the lens bulk matrix such that the ionic charges in the lens will be substantially neutralized at equilibrium as a result of the positively charged agent forming ion pairs with the negatively charged ions of the lens.

It is possible that the precursor chemical agent could be in a form (such as a solid) wherein it is not of the proper size or steric structure, yet when the precursor agent is delivered to the working solution it dissociates or changes sterically in its tertiary or quaternary structure into the actual chemical agent which is of the proper size, shape and charge.

The chemical agent should have an appropriate molecular weight in order easily to penetrate the pores of the lens and diffuse freely within the lens matrix, and a sufficient charge density to neutralize the charges of the lens quickly. Chemical agents having a molecular weight of at least about 100 typically have the requisite charge density. More preferably, the chemical agent should have a molecular weight and steric structure that is optimum for penetrating the pores. Preferably, the chemical agent possesses a molecular weight up to about 70,000. If the chemical agent has a molecular weight greater than 70,000, it may be too large to enter the pores of the lens matrix and neutralize the charge of the lens.

It is contemplated that a combination of chemical agents of different molecular weights is also useful in the context of the present invention. Such a combination allows treatment of a variety of lens materials, with the lens in use absorbing the most appropriate chemical agent.

If the chemical agent is only slightly smaller than the pore size of the lens polymers, the lens must be soaked for a longer period of time in order for the chemical agent to neutralize the charge associated with the lens. Desorption of such chemical agents will be slow due to the reduced degrees of freedom in the matrix pore, prolonging the time period of effective prevention of deposition of tear proteins. Thus, an optimum molecular weight up to about 70,000 exists for each candidate chemical entity that constitutes a compromise of shortest possible treatment time and longest possible time of effective prevention of protein deposition.

Preferably the chemical agent of the present invention absorbs more rapidly and/or less reversibly into the lens matrix than lysozyme so that the lysozyme which penetrates and adheres to the matrix is displaced by the chemical agent and/or is prevented from accumulating on the lens matrix and surface after the treatment process and during the lens wear period. Of course, the chemical agent must not impart undesirable characteristics to the lens.

Preferably the chemical agent is dissolved in an aqueous working solution at a pH ranging from about 6 to about 8.5. More preferably, the chemical agent is dissolved in the solution at pH of 7.4.

The solution of the present invention may be a buffered saline solution, contact lens disinfection solution or some other appropriate vehicle which is biocompatible with the eye or is rendered so by the end of the regimen time period. In addition to the chemical agent, the solution of the present invention may also include ophthalmically acceptable additives such as saline, buffers, preservatives, wetting agents, lubricating agents and/or surfactants, all of which are well known in the art. Further, the solution of the present invention may include disinfecting agents. Examples of disinfecting agents which may be used include, but are not limited to, polyquaternary amines, e.g., Croquat TM L which is commercially available from Croda, Inc., biguanides, and polymeric biguanides such as polyhexamethylene biguanide, available as Cosmocil® CQ from ICI Americas, peroxide and water soluble cationic polymers (WSCPs). WSCPs are available from Buckman Laboratories, Inc. and are described in U.S. Pat. No. 4,250,269, which is incorporated herein by this reference. Therefore, the solution can be preserved as a soaking solution or as part of a disinfecting solution.

Moreover, the tinted chemical agent can be delivered in a variety of forms including tablet, powder, granules, solution or spray. Tablet form is especially preferred. Such delivery vehicles may contain other ingredients well known in the art so long as they do not affect the chemical agent's function. Such additives include those previously noted as well as fillers, effervescents, biocides and other antimicrobial agents.

Preferably, the lens is contacted with the solution for a period of time sufficient to allow lens uptake of the agent to reduce subsequent protein deposition. In another embodiment, the contact time is also such that equilibrium favors desorption of the lysozyme. The desorbed lysozyme is then found solvated in the working solution.

The amount or presence of protein deposits on the lens surface and/or in the lens matrix can oftentimes be determined visually (naturally or with the aid of a magnifying glass) and by the degree of comfort experienced by one wearing the lens. UV spectroscopy or visible light microscopy may also be used to more accurately determine how much protein has been deposited on and in the lens. Chemical assays can also be performed to determine the total amount of protein on and in a contact lens if the lens will not be worn again and the purpose is solely to use these destructive techniques to measure total protein. Total protein can be chemically assayed utilizing standard techniques such as the ninhydrin assay.

It is preferable to soak the lens in about 2.0 to about 20.0 mL of the solution of the present invention for at least about ten minutes, and more preferably from about ten minutes to about twelve hours or overnight. It should be recognized that the amount of time the lens is to be soaked is inversely proportional to the concentration of the chemical agent contained in the solution. For example, by increasing the concentration of the chemical agent in the solution, the soaking time of the lens will be decreased. The soaking time may also depend upon the particular chemical agent being used and the type of lens being soaked.

Generally, the magnitude of the concentration of the chemical agent and the soak time will depend upon, in addition to the molecular weight range of said chemical agent, the amount of lysozyme sorption (adsorption and/or absorption) and the degree of lysozyme attraction to the lens material, as well as the recommended regimen for the user's lenses. It is possible that it may be necessary for the soaking to be repeated several times until the amount and/or the rate of accumulation of lysozyme on and/or in the lens has been appreciably reduced.

At the same time, it is preferable that a sufficient concentration of the tinted chemical agent be retained in the lens so that the lens has a slight tint, e.g., a handling tint. It is preferably slight enough so as to be detectable by the eye of a user when placed against a white background, but not so much as to be noticeable as a cosmetic tint. Preferably from about 0.05% to about 1.0% by weight of the tinted chemical agent is accumulated within the lens.

Preferably the solution of the present invention contains an effective amount of the tinted chemical agent, i.e., an amount effective to substantially reduce the presence and/or the formation and accumulation of protein deposits on and/or in the lens after a recommended regimen and provide a tint.

More specifically, it is preferred that the working solution contain about 0.01% to about 5.0% by weight of the chemical agent. More preferably, the solution of the present invention contains about 0.05% to about 1.0% by weight of the chemical agent.

It is preferred to soak the lens in the solution at room temperature. Although it may be possible to gently heat the solution, if the solution is more strongly heated, it is possible that the lysozyme may denature and eventually adhere to the lens even more strongly than before the treatment.

It is also preferable that the solution of a positively charged tinted protein preventor of the present invention be used to pretreat new contact lenses, that is, lenses that have never been worn before. For example, a contact lens may be prepackaged in the solution. Pretreating a contact lens in this solution will preferably allow the positively charged chemical agent to be sorbed by the lens, including in the lens matrix, such that the [lens/agent] complex is favored in the environment where the lens is exposed to lysozyme, e.g., in the eye. As a result, when the contact lens is first placed in the eye, the lysozyme in the eye will preferably have fewer sites to which to bind.

A lens swelling treatment may be performed in order to reduce the amount of proteins that may adhere to the lens surface and matrix. By making the solution of the present invention hypotonic and contacting the lens in this solution, the lens will appreciably swell and the pores of the matrix will expand, thereby accelerating and facilitating the rate at which the chemical agent binds to the negatively charged sites of the lens. The lens should not be excessively swelled since excessive swelling may permanently damage the lens and may cause the lysozyme to migrate deeper into the small polymeric pores of the matrix. Such hypotonic solution may be formed, for example, by contacting the chemical agent of this embodiment with water. It is preferable that the hypotonic solution contain 0.0% to about 0.6% and more preferably 0.4% by weight NaCl.

Preferably, the lens should be soaked in the hypotonic solution for a period of time ranging from about one minute to about thirty minutes, depending on the type of lens being swelled.

Instead of soaking the lens in the solution of the present invention, the solution may be sprayed, dropped or rubbed directly onto the surface of the lens before the lens is placed on the eye. By using this method of contacting the solution with the lens, it is preferable but not necessary to subsequently rinse the lens with an ophthalmically acceptable rinse solution. Instead, the tear itself will help wash away lysozyme which has been desorbed from the lens.

If the solution is to be contacted with the lens while the lens is in the eye, it is preferable that the solution does not contain more than about 1.0% by weight of the chemical agent, since any amount greater than about 1.0% may be toxic to the eye. If the solution should contain less than about 0.1% by weight of the chemical agent, the process of neutralizing the charge of the lens, generally, may take too long or may not be effective at all. On the other hand, if the lens has a low ionicity, it may be possible to effectively neutralize the charge of the lens by soaking it in a solution containing less than 0.1% by weight of the chemical agent. If a combination of agents is used, the total amount of all agents should conform to the foregoing limitations as well.

In sum, by contacting a contact lens with the solution of the present invention, the positively charged ions of the chemical agent in the solution are used to neutralize the negatively charged ions of the lens material. As a result of this electrostatic interaction, the electrostatic interaction between the lysozyme and the lens material is preferably substantially reduced and/or completely eliminated, thus lowering the primary interactive force responsible for incipient deposition of lysozyme on and/or in the lens. Moreover, the lens thereafter has a tint which, when it fades, provides an indication that it is time for a new treatment.

Lysozyme is the major tear constituent involved in the formation of deposits and lens soils on hydrophilic contact lenses, especially Group III lenses (low water-/ionic lens polymers) and Group IV (high water/ionic lens polymers) lenses. Since lysozyme is positively charged at physiological pH and at pHs encountered with lens care products (pH about 7.0 to 8.0), and contact lenses containing methacrylic acid as a copolymer, i.e., Group III and Group IV lenses, are negatively charged under these same conditions, there is formed an electrostatic attraction between the lens material and the lysozyme. With reference to the following equilibria, the typical electrostatic attraction between the lens material and the lysozyme favors an equilibrium of higher concentration of the protein on the lens than in a medium such as a tear or lens care solution and, thus, results in the formation and accumulation of lysozyme on and/or in the lens.

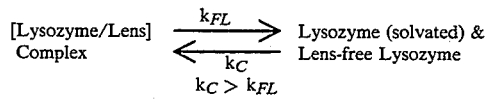

$$[\text{Lysozyme/Lens Complex}] \underset{k_C}{\overset{k_{FL}}{\rightleftarrows}} \text{Lysozyme (solvated)} \ \& \ \text{Lens-free Lysozyme}$$
$$k_C > k_{FL}$$

For example, Group IV lens materials have a pore size sufficient to accommodate the intrusion and accumulation of lysozyme within the lens. Even though the deeper migration of lysozyme into the lens bulk matrix is a slower process than surface accumulation, protein deposits imbedded in the matrix of a lens are less reversibly bound and are more difficult to remove than proteins deposited on the surface of the lens.

By using a tinted chemical agent of the present invention to increase $k_{FL}/k_C$, the solution of the present invention becomes more effective at facilitating inhibiting the uptake of lysozyme and reducing the formation of lysozyme deposits on and in the lens.

In another embodiment of the present invention, the tinted agent can be employed alone in combination with one or more additional chemical agents preferably selected from the group consisting of basic polymeric carbohydrates, such as chitosan, chitosan salts such as chitosan hydrochloride, chitosan derivatives such as chitosan biguanide and mixtures thereof. The additional chemical agents are clear, i.e., they do not impart a tint to the lens.

Chitosan is made by the partial deacetylation of chitin, a polysaccharide obtained from certain fungi and the exoskeletons of arthropods. Chitosan is chemically identical to modified cellulose in which the C-2 hydroxyl groups have been replaced with primary amine functions. This molecule is positively charged at physiological pH's of 7 to 7.4.

The foregoing discussion of preferred weight percentages, molecular weights and steric structure applies to the optional additional chemical agents listed above as well as to the tinted chemical agent.

In another embodiment of the present invention, a method for detecting the presence of protein deposits on a contact lens is provided. Positively charged chemical agents which impart a tint to the lens, such as methylene blue, can also stain protein deposits which remain on the lens. By contacting the lens with such a chemical agent, protein deposits which are present on the lens can be observed. When such deposits become visible to the naked eye, the contact lens user in informed that more vigorous cleaning of the lens is required.

In another embodiment of the present invention, the tinted chemical agent can be added to the hypotonic solution. In this embodiment, the tinted chemical agent preferably has a delayed or time-release coating. This allows more time for the lens to swell and facilitate the rate at which the agent binds to the negatively charged sites of the lens, before the lens and the pores of the matrix shrink back to their previous, desired size prior to having been placed in the hypotonic solution.

Even though the tinted chemical agent of this embodiment may be directly added to the hypotonic solution in the form of a solution, in order to add the chemical agent to the hypotonic solution in a delayed-release manner it is preferred that the chemical agent be present in the form of a tablet, pill, capsule, powder or the like which includes a coated portion. For example, a tablet may have a core containing the chemical agent and thereupon placed a barrier component coating to delay release of the chemical agent present in the core.

If the solution to which the agent is added has a pH higher or lower than physiological pH, it may be desirable to add an additive to the core in order to maintain and/or bring the pH of the working solution to about 7.0 to about 8.0. Lysine dihydrochloride, tartaric acid, citric acid, sodium carbonate and mixtures thereof are examples of additives which may be used to help neutralize the pH of the solution.

The barrier component coating can act to delay the release of the chemical agent from the core portion, preferably, for a period of time sufficient to reduce the accumulation of lysozyme at the surface of the lens and in the lens matrix.

The delayed-release of the chemical agent into the solution may be accomplished in any one of a number of suitable ways, a number of which are conventional and well known in the art. A barrier component may consist of a slowly dissolving coating material.

Barrier components suitable as coatings include water soluble vinyl polymers such as polyvinyl pyrrolidone, polyvinyl alcohol and polyethylene glycol; water soluble protein, polysaccharide and cellulose derivatives such as methylcellulose, hydroxypropyl methylcellulose, sodium carboxymethylcellulose, alginic acid and its salts and other derivatives, and the like and mixtures thereof.

The amount of barrier component used is not critical in the present invention provided that such barrier component functions as described herein.

A preferred delayed-release coating or barrier component is derived from a mixture comprising polyvinyl alcohol and a water soluble soaking component.

Alternatively, instead of providing a tablet, for example, having a core containing the chemical agent, the core may include only the additive, and the additive may be covered with a mixture of the chemical agent and the barrier component. Also, the tablet may be comprised of a core which includes the pH neutralizing additive. This core may then be covered with the barrier component, and the barrier component, in turn, may be covered by the chemical agent which is also covered with another layer of the barrier component.

Exemplary compositions for use according to the present invention are given below. All amounts are in weight percent.

| Example 1 | Buffered saline solution |
|---|---|
| Disodium EDTA | 0.10 w/v % |
| Sodium chloride | 0.85 |
| Boric acid | 0.10 |
| Methylene blue | 0.05 |
| 1 N NaOH | to adjust to pH 8.0 |
| Water | balance |

| Example 2 | Soft lens cleaner |
|---|---|
| Miranol 2MCA, modified | 0.002 w/v % |
| Sorbic acid | 0.110 |
| EDTA | 0.20 |
| Propylene glycol | 0.0011 |
| Hydroxyethyl cellulose | 0.50 |
| Methylene blue | 0.10 |
| Water | balance |

Lenses to be cleaned are rubbed with 3 drops for 20 seconds as part of a cleaning regimen including heat treatment.

| Example 3 | Multipurpose solution |
|---|---|
| Polyhexamethylene biguanide, Cosmocil CQ | 0.0001 w/v % |
| Edetate disodium USP | 0.05 |
| Sodium chloride USP | 0.37 |
| Tromethamine | 1.20 |
| Tyloxapol USP | 0.025 |
| Methylene blue | 0.10 |
| HCl | to adjust to pH 7.5 |
| Water | balance |

| Example 4 | Multipurpose solution |
|---|---|
| Hydroxyethyl cellulose NF | 0.65 w/v % |
| Sodium chloride USP | 0.67 |
| Boric acid NF | 0.39 |
| Sodium borate decahydrate NF | 0.20 |
| Edetate disodium USP | 0.127 |
| WSCP | 0.006 |
| Croquat L | 0.010 |
| FD & C Green #3 | 0.10 |
| Water | balance |

| Example 5 | Multipurpose solution |
|---|---|
| Pluronic F-127 | 0.10 w/v % |
| Sodium chloride | 0.40 |
| Boric acid | 0.39 |
| Sodium borate decahydrate NF | 0.20 |
| Edetate disodium | 0.127 |
| WSCP | 0.003 |
| FD & C Green #3 | 0.10 |
| Water | balance |

| Example 6 | Tablet |
|---|---|
| Di-Pac | 40.0 mg/tablet |
| Polyethylene glycol 3350 | 4.0 |
| Povidone PVP K-30 | 4.0 |
| Methylene blue | 2.0 |

| Example 7 | Tablet |
|---|---|
| Di-Pac | 40.0 mg/tablet |
| Polyethylene glycol 3350 | 4.0 |
| Povidone PVP K-30 | 4.0 |
| Sodium carbonate, anhydrous | 2.0 |
| Methylene blue | 2.0 |

Di-Pac is a compressible sugar comprised of 97 w/w % sucrose and 3 w/w % maltodextrin. Di-Pac is commercially available from Amstar Sugar Corp. and is distributed by Austin Chemical Co. of Illinois.

The tablets of Examples 6 and 7 can abe dissolved in contact lens multipurpose solutions. In particular, the tablets can be dissolved in 2.0 ml of a contact lens multipurpose soaking, cleaning, disinfecting and rinsing solution such as ReNu, sold by Bausch and Lomb; Optifree, sold by Alcon; and Complete, sold by Allergan.

Having thus described the exemplary embodiments of the present invention, it should be noted by those skilled in the art that the within disclosures are exemplary only and that various other alternatives, adaptations and modifications may be made without departing from the spirit and scope of the present invention. Accordingly, the present invention is not limited to the specific embodiments illustrated herein, but is only limited by the following claims.

What is claimed is:

1. A method of reducing the formation and inhibiting the uptake of protein deposits on the outer surface or in the inner bulk matrix of a hydrophilic contact lens comprising the step of contacting the contact lens with a solution at physiological pH containing at least about 0.01% by weight of a biocompatible positively charged chemical agent which imparts a tint to the lens, the agent being selected from the group consisting of methylene blue and FD&C Green #3, wherein the solution has a pH ranging from about 6 to about 8.5.

2. The method as defined in claim 1 wherein the solution is hypotonic.

3. The method as defined in claim 1 wherein said solution contains about 0.05 to about 1% by weight of the biocompatible positively charged chemical agent.

4. A method of reducing the formation and inhibiting the uptake of protein deposits on or in a hydrophilic contact lens wherein the lens has an outer surface and an inner bulk matrix with polymeric pores, the method comprising the steps of:

a) placing the lens in a hypotonic solution for a period of time sufficient to cause the lens to swell and the pores of the matrix to expand;

b) adding a biocompatible positively charged chemical agent selected from the group consisting of methylene blue and FD&C Green #3 to the solution such that the solution possesses an osmotic pressure sufficient to cause the lens and the pores of the matrix to constrict, and wherein the biocompatible positively charged chemical agent is present in an amount sufficient to cause desorption of the protein deposits from the surface or matrix of the lens and imparts a tint to the lens; and c) soaking the lens in the solution comprising the biocompatible positively charged chemical agent for a period of time sufficient to appreciably reduce the formation of protein deposits on or in the lens.

5. The method as defined in claim 4 wherein after treatment, the lens is tinted.

6. The method as defined in claim 4 wherein there is present by weight about 0.01% to 5.0% of the positively charged chemical biocompatible positively charged chemical agent.

7. The method as defined in claim 4 further including adding the positively charged chemical biocompatible positively charged chemical agent to an aqueous solution wherein the solution has a pH ranging from 6 to 8.

8. The method as defined in claim 4 wherein the positively charged chemical biocompatible positively charged chemical agent is employed in combination with at least one chemical agent selected from the group consisting of chitosan and its salts and derivatives.

9. The method as defined in claim 4 wherein a plurality of positively charged chemical biocompatible positively charged chemical agents having different molecular weights are employed.

10. The method as defined in claim 6 wherein there is present by weight about 0.05 to 1% of the biocompatible positively charged chemical agent.

* * * * *